Sept. 2, 1924.
A. SCHILLING
METHOD FOR THE RECOVERY OF SALT
Filed Jan. 5, 1922
1,506,946
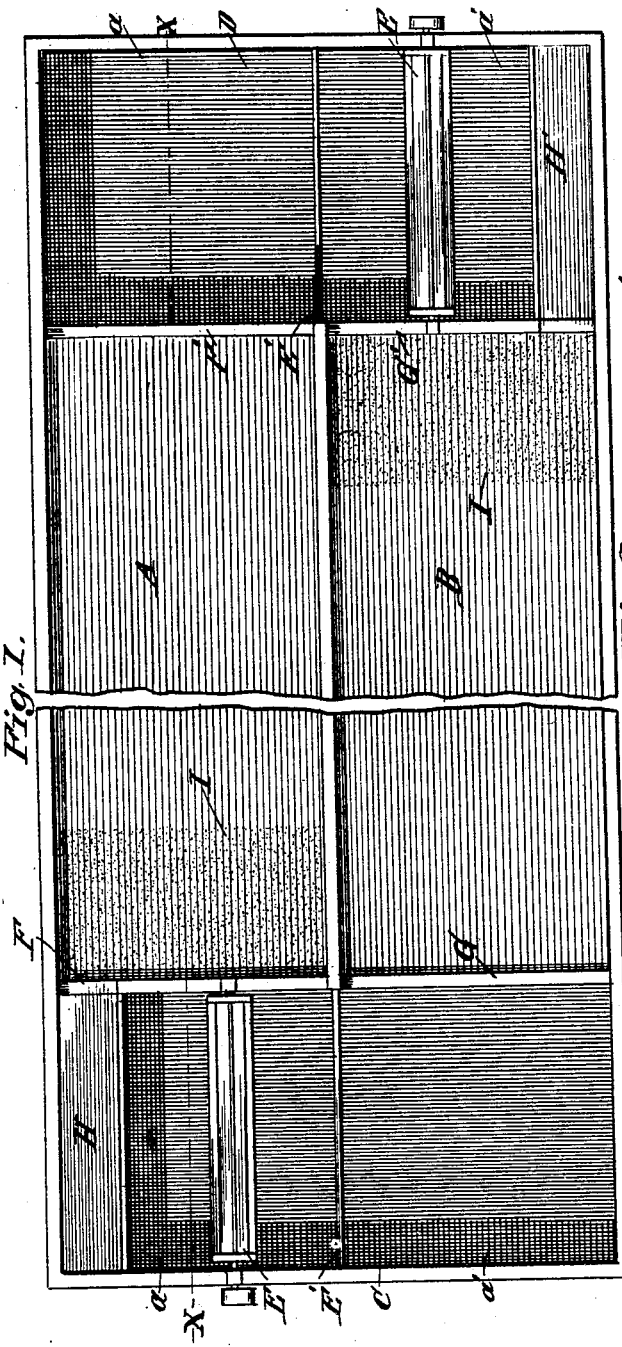
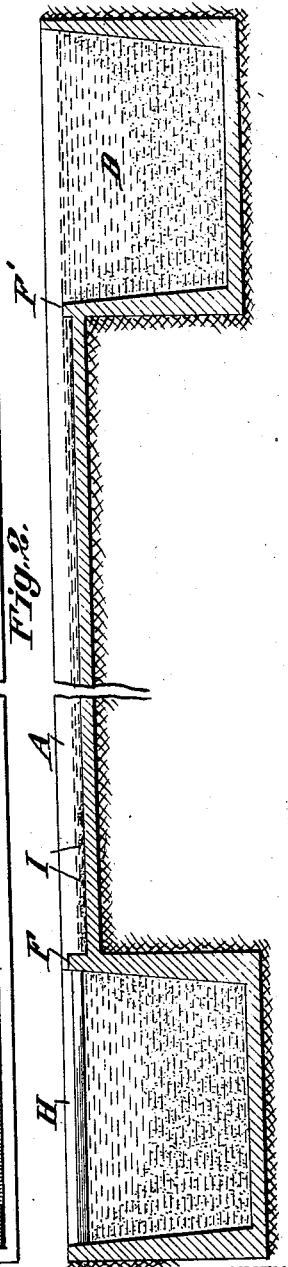
INVENTOR.
August Schilling.
BY
ATTORNEYS.

Patented Sept. 2, 1924.

1,506,946

UNITED STATES PATENT OFFICE.

AUGUST SCHILLING, OF SAN FRANCISCO, CALIFORNIA.

METHOD FOR THE RECOVERY OF SALT.

Application filed January 5, 1922. Serial No. 527,221.

*To all whom it may concern:*

Be it known that I, AUGUST SCHILLING, a citizen of the United States, residing in the city and county of San Francisco and State of California, have invented certain new and useful Improvements in Methods for the Recovery of Salt, of which the following is a specification.

The method heretofore employed for the recovery of salt from a brine solution resides generally in subjecting a large body of the said solution to the action of the sun and the atmosphere, and the means employed for this purpose is that which is commonly known as a salt pond, usually one of large area, the salt contained within the solution being gradually precipitated and deposited on the bottom of the pond from which it is recovered by suitable mechanism for the recovery of salt therefrom in the usual manner. I have discovered that, if a body of the brine solution be subdivided into a flowing stream or layer of shallow depth, and be conveyed for a distance exposed to the atmosphere and the sun as a shallow layer, there is a quicker creation of salt from the solution, producing two types of salt:—

1. So-called grainer salt which floats on the surface of the flowing body, and
2. So-called bottom salt, which crystallizes on the bottom with a change of temperature, on the principle that as the water cools, say, during the night, it will contain a slightly smaller quantity of salt in solution, which quantity accordingly leaves the solution and crystallizes at the bottom.

In certain sections of the country, there are found deposits of natural salt, which can be improved through the present recrystallizing process. Under the present invention, such salt may be transported as natural salt to distant points or cities, which may be treated as distributing points, and at which the said material is placed in solution and as such treated for the recovery of the salt therefrom, or, in other words, a body of brine solution is formed which is then treated according to the present method for the purification and recovery of the salt therefrom.

In the carrying out of the invention, there is employed what may be termed a double sluice or runway, that is to say, two runways are arranged substantially parallel, so as to permit of the saline solution being first conveyed or moved in one direction from a suitable sump and thence transferred or returned in the opposite direction from a second sump, whereby there is a continuous movement of the saline solution in a to and fro course of travel during the operation of treatment for the recovery of the salt therefrom.

The salt is either formed (produced) on the surface of the brine where the same floats as so-called grainer salt, or crystallizes at the bottom of the runways with a change of temperature, as for instance a lower temperature at night would lessen the quantity of salt that the brine will hold in solution, hence it crystallizes as bottom salt. The grainer salt which floats on the surface of the solution is carried by the flowing of said solution towards the discharge end of the runway through which the solution is moving and is deposited into the sump at such end of the runway.

To comprehend the invention, reference should be had to the accompanying sheet of drawings, wherein :—

Figure 1 is a plan view of the apparatus for the carrying out of the method invention.

Figure 2 is a longitudinal sectional view taken on the line X—X Figure 1 of the drawings.

In the drawings, the letter A is used to indicate one sluice or runway, and B the companion sluice or runway arranged parallel thereof. These runways are preferably formed of concrete, and the depth thereof is substantially eight or twelve inches, each sluice or runway having a width of approximately ten to sixteen feet. These sluiceways communicate at their ends with transversely disposed sumps C and D, there being arranged in each of said sumps a transversely disposed paddle wheel E driven by any suitable form of drive mechanism. The sumps C and D in length approximate the combined width of the sluices or runways A and B, and have a depth of approximately eight feet. However, the depth of the sumps may be varied as required, and the said sumps like the runways A and B are preferably formed of concrete. The sluices or runways A and B are of considerable length—from one half to a mile, although the length thereof may be varied in accordance with working requirements. At the feed end of the sluiceway A is arranged a transverse barrier F approximately ten inches in height, and at the discharge end thereof is arranged a transverse barrier F' approximately six inches in height, while at the feed end of the sluice or runway B is arranged a transversely disposed barrier G approximately ten inches in height, while at its discharge end it is provided with a transversely disposed barrier G' approximately six inches in height. Each sump C and D is subdivided, so to speak, by a longitudinally disposed baffle plate E' which extends downwardly for a distance of approximately four to six inches, the said baffle plate E' subdividing the sumps C and D into two compartments a—a'. The paddle wheels E are mounted for rotation within the compartments a of the sumps C and D respectively. As the brine solution is discharged into the compartments a' of the said sumps, the grainer salt floating therewith is caused to be deflected by the baffle plates E' beneath the surface of the solution contained within the sumps E and settles to the bottom of the sumps from which said grainer salt is removed in any suitable manner. As the paddle wheels E are of small diameter and only dip into the surface of the solution within the sumps C and D to a slight extent, the rotary action of said wheels does not disturb the grainer salt precipitated to the bottom of the said sumps.

During operation, there is formed a saturated brine solution which is deposited in the sumps C and D, and by the action of the paddle wheels E the said solution is lifted from the sumps and deposited respectively in the conduits H and H'. The solution deposited in the conduit H flowing over the barrier wall F into the runway or sluice A and flowing thereover toward the discharge end, being retained therein until the solution has reached a depth sufficient to overflow the barrier wall F' into the sump D, while the brine solution contained within the sump D is lifted by the paddle wheel E working therein and is lifted thereby and deposited into the conduit H' from which it flows into the sluice or conduit B, gradually flowing the length thereof until its depth is sufficient to permit of the same flowing over the transversely disposed wall G' into the sump C. Under this arrangement, the body of saline solution travels as a shallow flowing stream or layer in a to and fro course between the sumps C and D, and during its flow is subjected to the action of the sun, wind and atmosphere, which causes the evaporation of the solution and a deposit of the bottom salt crystals onto the bottom of the sluices or runways A and B respectively, the flowing streams of the brine solution being maintained until such time as the said sluices or runways A and B become substantially filled with the salt deposited from the solution. The grainer salt floating on the surface of the flowing solution is carried thereby and deposited with the discharge of the solution from the runways A and B into the compartments a' of the sumps C and D. After the sluices or runways have become substantially filled with bottom salt, the operation or movement of the brine solution is arrested and the salt removed from the sluices or runways in any suitable manner for transportation as purified salt, and after a sufficient quantity of the grainer salt has been collected in the sumps C—D, the same is removed therefrom in any suitable manner.

At times it is desired to build up, so to speak, larger crystals of salt than ordinarily would be formed by the flowing streams of the brine solution, and to accomplish this a certain portion of the salt deposited on the bottoms of the sluices or runways A and B and adjacent the receiving end portions thereof is broken up and arranged in transversely disposed ridges or piles I, and when so arranged as the brine solution flows thereover there is a certain retardation and a building up of the crystals until they have reached a proper size, the salt thus formed being that which is commonly employed in connection with food for animals, required to be of larger size than the salt employed for human consumption.

It will be noted from the foregoing that the invention resides in the impounding of a comparatively large body of saline solution within suitable sumps, lifting the solution from said sumps and causing the same to flow as a shallow stream or layer of solution for a distance within and over parallel sluices or runways, subjecting the said shallow depth flow streams of brine to the action of the sun, wind, and atmosphere, whereby the salt is gradually deposited and built up on the bottom of the said sluices or runways, the body of solution being maintained in a continuous to and fro course of travel, and which flow of the body of brine as subdivided layers is maintained until the crystals have suitably built up within the said sluices or runways.

During treatment the brine solution is maintained in movement, although the flow of the layers of the solution over and within the sluices or runways A and B is comparatively slow, and as the distance of travel is a comparative long one, ample time is provided for the settling and building up of the salt crystals on the bottoms of said sluices or runways.

The bottom salt deposited and built up in the sluices or runways is thoroughly washed and cleansed of foreign substances, so its deposit is of substantially pure salt, while the grainer salt is carried and deposited as salt of high quality into the sumps C—D.

From the foregoing, it will be noted that in the carrying out of my method there is a recovery of two types of salt, viz:—the grainer salt and the bottom salt, and which recovery of the two types of salt is successfully and practically produced by the subdividing of the body of brine solution into flowing shallow layers or streams of brine having a considerable area exposure to the action of the sun and atmosphere. There is a third recovery, or type of salt produced, and which is formed by the building up of the crystals by the arrangement of the bottom salt in transverse ridges with respect to the runways A and B, but for all practical purposes such may be considered and treated as bottom salt, and therefore no distinction is made between such type of salt and the type which is termed herein as bottom salt.

Having thus described the invention what is claimed as new and desired to protect by Letters Patent is:—

The method of recovering salt of substantial purity, which consists in maintaining a brine solution in circulation in shallow layers in a to and fro course exposed to the action of the sun and atmosphere to effect evaporation and crystallization permitting course salt granules formed in the brine to settle from the layers and build up, trapping in a body of brine at the end of each to and fro course of travel the floating salt granules formed on the brine in circulation, and separately removing the settled course salt granules, and the trapped salt.

In testimony whereof I have signed my name to this specification.

AUGUST SCHILLING.